United States Patent [19]
Kishi

[11] Patent Number: 5,696,538
[45] Date of Patent: Dec. 9, 1997

[54] APPARATUS FOR DETECTING INPUT-PEN'S INCLINATION, AND PEN INPUT APPARATUS EQUIPPED WITH IT

[75] Inventor: Nobuya Kishi, Yamatokoriyama, Japan

[73] Assignee: Sharp Kabushiki Kaisha, Osaka, Japan

[21] Appl. No.: 636,939

[22] Filed: Apr. 24, 1996

[30] Foreign Application Priority Data

Jun. 29, 1995 [JP] Japan .................................. 7-164113

[51] Int. Cl.$^6$ .................................................. G08C 21/00
[52] U.S. Cl. ........................... 345/179; 178/18; 345/180; 345/181; 345/182; 345/183; 345/162
[58] Field of Search ............................. 178/18; 345/179, 345/180–183, 162

[56] References Cited

U.S. PATENT DOCUMENTS

| | | | |
|---|---|---|---|
| 4,568,799 | 2/1986 | Kobayashi et al. | 178/18 |
| 4,831,568 | 5/1989 | Ito | 364/709.11 |
| 4,931,965 | 6/1990 | Kaneko et al. | 364/560 |
| 5,239,139 | 8/1993 | Zuta | 178/18 |
| 5,461,703 | 10/1995 | Goyins et al. | 395/109 |
| 5,491,305 | 2/1996 | Kawakami et al. | 178/19 |
| 5,548,092 | 8/1996 | Shriver | 178/18 |

FOREIGN PATENT DOCUMENTS

| | | |
|---|---|---|
| 63-46532 | 2/1988 | Japan . |
| 3-171321 | 7/1991 | Japan . |
| 6-274264 | 9/1994 | Japan . |
| 7-64694 | 3/1995 | Japan . |

*Primary Examiner*—Kee M. Tung
*Assistant Examiner*—Vincent E. Kovalick
*Attorney, Agent, or Firm*—Nixon & Vanderhye P.C.

[57] ABSTRACT

A pen input apparatus of the present invention is provided with an apparatus for detecting an inclination of an input pen. The apparatus for detecting an inclination of an input pen is composed of a hemispherical container, a conductive movable body, and detecting means. The hemispherical container, in which a hemispherical cavity is created, has an axis congruent with the axis of the input pen, and is provided so as to integrally move with the input pen, while a plurality of ring-shaped electrodes are concentrically provided with the input pen. The conductive movable body is provided in the hemispherical cavity, and moves according to the inclination of the input pen due to gravity. The detecting means detects the position of the movable body in the hemispherical cavity in accordance with how continuity is between the ring-shaped electrodes, and detects an inclination of the input pen in accordance with the detected position of the movable body. The pen input apparatus has a simple structure, and is superior in the response speed, since the inclination of the input pen is detected without detecting coordinates.

8 Claims, 15 Drawing Sheets

FIG.3(a)
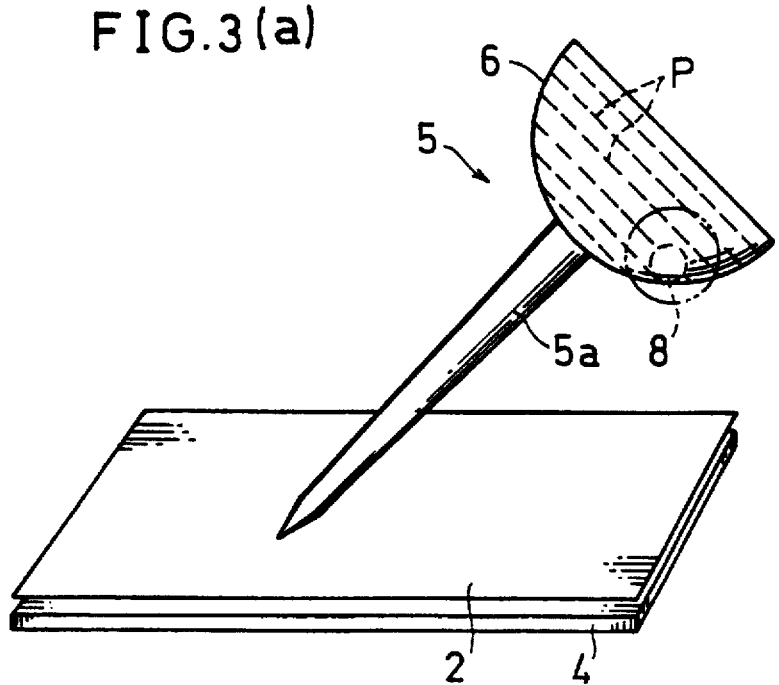
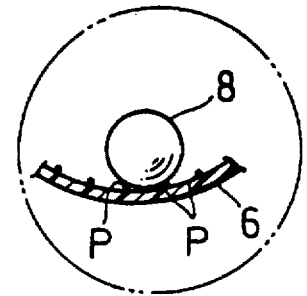
FIG.3(a-1)
FIG.3(b)
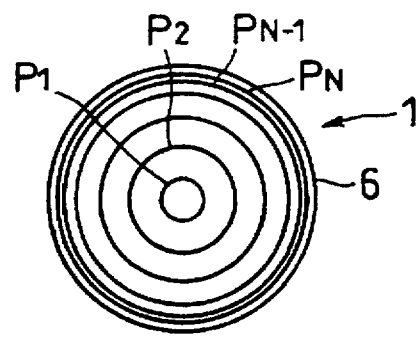
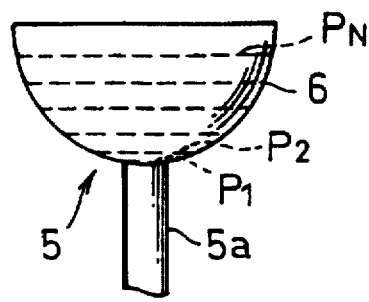
FIG.3(b-1)

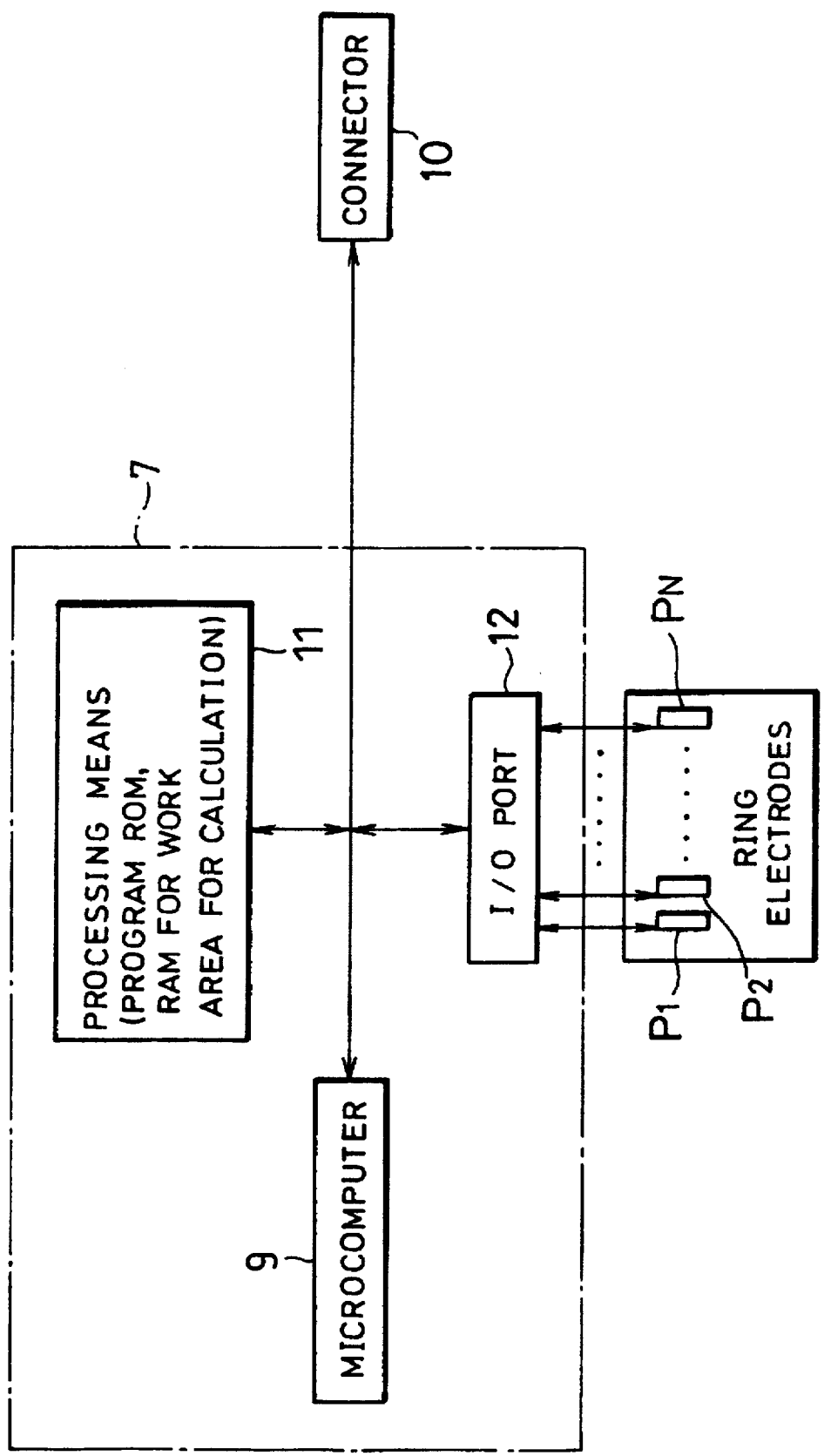

FIG. 7

N: NUMBER OF RING ELECTRODES (ODD NUMBER)

| INCLINATION | VOLTAGE INPUT ELECTRODE | | | | | | | | | VOLTAGE OUTPUT ELECTRODE | | | | | | | | |
|---|---|---|---|---|---|---|---|---|---|---|---|---|---|---|---|---|---|---|
| | $P_{N-1}$ | $P_{N-3}$ | ... | $P_{n+1}$ | $P_{n-1}$ | ... | $P_4$ | $P_2$ | $P_N$ | $P_{N-2}$ | $P_n$ | ... | $P_{n-2}$ | ... | $P_3$ | $P_1$ |
| 1 | 0 | 0 | (ALL 0) | 0 | 0 | (ALL 0) | 0 | 0 | 1 | 1 | 1 | (ALL 1) | 1 | ... | 1 | 1 |
| 2 | 0 | 0 | (ALL 0) | 0 | 0 | (ALL 0) | 0 | 1 | 0 | 0 | 0 | (ALL 0) | 0 | ... | 0 | 1 |
| 3 | 0 | 0 | (ALL 0) | 0 | 0 | (ALL 0) | 0 | 1 | 0 | 0 | 0 | (ALL 0) | 0 | ... | 1 | 0 |
| 4 | 0 | 0 | (ALL 0) | 0 | 0 | (ALL 0) | 1 | 0 | 0 | 0 | 0 | (ALL 0) | 0 | ... | 1 | 0 |
| ... | ... | ... | | ... | ... | | ... | ... | ... | ... | ... | | ... | | ... | ... |
| n-1 | 0 | 0 | (ALL 0) | 0 | 1 | (ALL 0) | 0 | 0 | 0 | 0 | 0 | (ALL 0) | 1 | ... | 0 | 0 |
| n | 0 | 0 | (ALL 0) | 0 | 1 | (ALL 0) | 0 | 0 | 0 | 0 | 1 | (ALL 0) | 0 | ... | 0 | 0 |
| n+1 | 0 | 0 | (ALL 0) | 1 | 0 | (ALL 0) | 0 | 0 | 0 | 0 | 1 | (ALL 0) | 0 | ... | 0 | 0 |
| ... | ... | ... | | ... | ... | | ... | ... | ... | ... | ... | | ... | | ... | ... |
| N-2 | 0 | 1 | (ALL 0) | 0 | 0 | (ALL 0) | 0 | 0 | 0 | 1 | 0 | (ALL 0) | 0 | ... | 0 | 0 |
| N-1 | 1 | 0 | (ALL 0) | 0 | 0 | (ALL 0) | 0 | 0 | 1 | 1 | 0 | (ALL 0) | 0 | ... | 0 | 0 |
| N | 1 | 0 | (ALL 0) | 0 | 0 | (ALL 0) | 0 | 0 | 1 | 0 | 0 | (ALL 0) | 0 | ... | 0 | 0 |

FIG. 8

N: NUMBER OF RING ELECTRODES (EVEN NUMBER)

| | VOLTAGE OUTPUT ELECTRODE | | | | | | | VOLTAGE INPUT ELECTRODE | | | | | | | | INCLINATION |
|---|---|---|---|---|---|---|---|---|---|---|---|---|---|---|---|---|
| $P_1$ | $P_3$ | ... | $P_{n-3}$ | $P_{n-1}$ | ... | $P_{N-3}$ | $P_{N-1}$ | $P_2$ | $P_4$ | ... | $P_{n-2}$ | $P_n$ | ... | $P_{N-2}$ | $P_N$ | |
| 1 | 1 | (ALL 1) | 1 | 1 | (ALL 1) | 1 | 1 | 0 | 0 | (ALL 0) | 0 | 0 | ... | 0 | 0 | 1 |
| 1 | 0 | (ALL 0) | 0 | 0 | (ALL 0) | 0 | 0 | 1 | 0 | (ALL 0) | 0 | 0 | ... | 0 | 0 | 2 |
| 0 | 1 | (ALL 0) | 0 | 0 | (ALL 0) | 0 | 0 | 1 | 0 | (ALL 0) | 0 | 0 | ... | 0 | 0 | 3 |
| 0 | 1 | (ALL 0) | 0 | 0 | (ALL 0) | 0 | 0 | 0 | 1 | (ALL 0) | 0 | 0 | ... | 0 | 0 | 4 |
| ... | ... | | ... | ... | | ... | ... | ... | ... | | ... | ... | | ... | ... | ... |
| 0 | 0 | (ALL 0) | 1 | 0 | (ALL 0) | 0 | 0 | 0 | 0 | (ALL 0) | 1 | 0 | ... | 0 | 0 | n-2 |
| 0 | 0 | (ALL 0) | 0 | 1 | (ALL 0) | 0 | 0 | 0 | 0 | (ALL 0) | 1 | 0 | ... | 0 | 0 | n-1 |
| 0 | 0 | | 1 | 1 | | 0 | 0 | 0 | 0 | | 0 | 1 | | 0 | 0 | n |
| ... | ... | | ... | ... | | ... | ... | ... | ... | | ... | ... | | ... | ... | ... |
| 0 | 0 | (ALL 0) | 0 | 0 | (ALL 0) | 1 | 0 | 0 | 0 | (ALL 0) | 0 | 0 | (ALL 0) | 1 | 0 | N-2 |
| 0 | 0 | (ALL 0) | 0 | 0 | (ALL 0) | 0 | 1 | 0 | 0 | (ALL 0) | 0 | 0 | (ALL 0) | 1 | 0 | N-1 |
| 0 | 0 | (ALL 0) | 0 | 0 | (ALL 0) | 0 | 1 | 0 | 0 | (ALL 0) | 0 | 0 | (ALL 0) | 0 | 1 | N |

FIG.9(a)

WHEN INPUT PEN
DOESN'T INCLINE

BALL IS IN CONTACT ONLY WITH
RING ELECTRODE P1.

↓

INCLINATION IS DEFINED AS 1

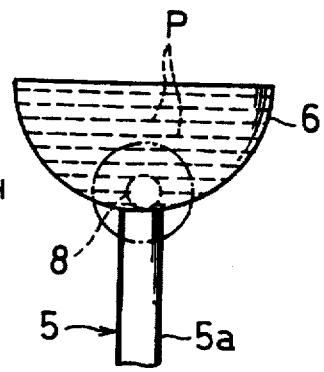

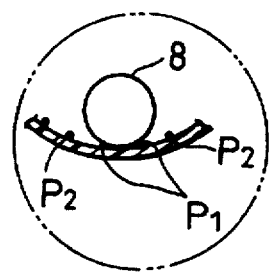

WHEN INPUT PEN INCLINES

BALL IS IN CONTACT WITH RING
ELECTRODES $P_{n-1}$ AND $P_n$,
CAUSING ELECTRODES TO
SHORT-CIRCUIT.

↓

INCLINATION IS DEFINED AS n

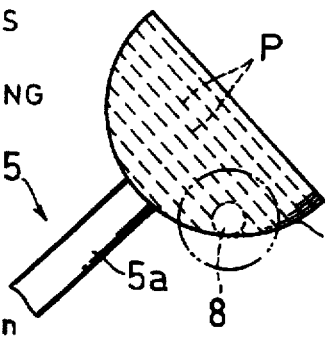

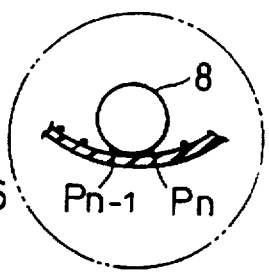

WHEN INPUT PEN INCLINES
TO MAXIMUM EXTENT

BALL IS IN CONTACT
WITH RING ELECTRODES
$P_{N-1}$ AND $P_N$,
CAUSING THE ELECTRODES
TO SHORT-CIRCUIT.

↓

INCLINATION IS DEFINED AS N

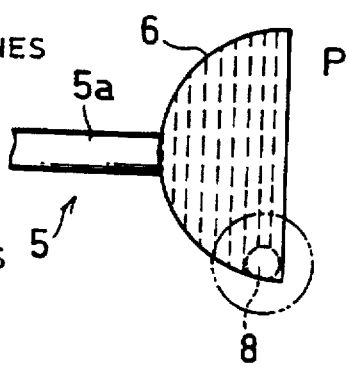

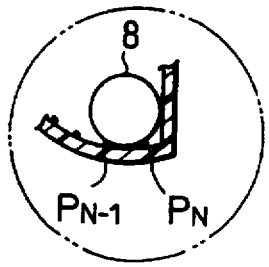

FIG.9(c-1)

APPARATUS FOR DETECTING INPUT-PEN'S INCLINATION, AND PEN INPUT APPARATUS EQUIPPED WITH IT

FIELD OF THE INVENTION

The present invention relates to an apparatus for detecting a input-pen's inclination, for use in a pen input apparatus such as an apparatus for inputting characters by handwriting, an apparatus for inputting drawings by handwriting, a pointing device, and an apparatus for entering an x-y-z-coordinate, and also relates to a pen input apparatus having such an apparatus.

BACKGROUND OF THE INVENTION

According to conventional pen input apparatuses, the width of a line to be drawn has been changed as follows. More specifically, according to one arrangement, the line width is changed according to detected strength of a brush-stroke (see Japanese Publication for Unexamined Patent Application No. 63-46532/1988). According to another arrangement, an input pen is provided with switches so that different types of lines in terms of such as line width, line consistency, and color, can be selected by switching of the switches (see Japanese Publication for Unexamined Patent Application No. 6-274264/1990).

However, according to the first conventional arrangement, since no consideration is made on a difference in the line width depending on a used writing implement such as a pen, a pencil, and a crayon, it is not possible to reproduce a touch of such a writing implement and a feel of handwriting. The second conventional arrangement also has a problem of awkwardness in handling, since it is required to bother to flip a switch.

In contrast, Japanese Publication for Unexamined Patent Application No. 3-171321/1991 proposes the third arrangement wherein the inclination of a coordinate indicator (equivalent to an input pen) is detected so that the line width is changed based on the result of the detection. The arrangement is capable of reproducing a touch of a writing implement and a feel of handwriting, since required is only inclining the coordinate indicator. Therefore such an arrangement allows the operation to be natural without the bothersome switching actions.

FIG. 15 is a block diagram illustrating an input-output device in accordance with the third arrangement. The device has a coordinate input unit 52 and a liquid crystal display 55, which are laid one on top of the other, forming a display-input screen. When a coordinate indicator 51 indicates a coordinate on the display-input screen, the coordinate input unit 52 detects the indicated coordinate and sends it to a control unit 53. The control unit 53 commands a display drive unit 54 to display the indicated coordinate as the locus of the coordinate indicator 51. In response to the command, the display drive unit 54 drives the liquid crystal display 55 to display.

The coordinate indicator 51 is provided with a first and a second exciting coils 56 and 57 for respectively detecting a coordinate. When the coordinate indicator 51 is operated on the coordinate input unit 52, coordinates (X1, Y1) and (X2, Y2) of the respective coils 56 and 57 are detected. Then, the control unit 53 finds an inclination angle S with respect to the z axis of the coordinate indicator 51, based on the detected coordinates (X1, Y1) and (X2, Y2) as well as the distance L between the coils 56 and 57, by using the following equation:

$$S = \sin^{-1}[((X2-X1)^2 + (Y2-Y1)^2)^{1/2} / L]$$

However, the third conventional apparatus adopting such an arrangement as mentioned above for detecting an inclination of the coordinate indicator 51 has a complicated structure, thereby costing high. On the other hand, such an apparatus also has problems of being slow in response and sometimes failing to find an inclination even though an coordinate indicator indicates a coordinate which falls within the sphere where coordinates can be inputted.

To be more specific, the above arrangement requires at least one exciting coil for detecting a coordinate so as to obtain an inclination angle S of the coordinate indicator 51. This causes the structure of the coordinate indicator 51 to be complicated, thereby causing the cost to rise. Further, the above complicated calculation for finding an inclination angle S needs to be repeated whenever the inclination of the coordinate indicator 51 changes. Therefore, such calculation causes a microcomputer, generally low performance, provided in the coordinate indicator 51, to have a heavy load. This causes the microcomputer not to quickly respond. In addition, a coordinate cannot be detected when the first and the second coils 56 and 57 are placed outside the coordinate input unit 52, for example, when the coordinate indicator 51 is brought to an edge of the coordinate input unit 52, with the coordinate indicator 51 inclined toward the outside of the coordinate input unit 52. In such a case, it is impossible to detect an inclination angle S.

SUMMARY OF THE INVENTION

The object of the present invention is to provide an apparatus for detecting an inclination of an input pen in a simple structure, which doesn't require the detection of a coordinate and has superiority in the response speed. Another object of the present invention is to provide a pen input apparatus for use with such an input-pen's inclination detecting apparatus.

To achieve the object, an input-pen's inclination detecting apparatus of the present invention comprises (1) a hemispherical container, in which a hemispherical cavity is created. The hemispherical container has an axis congruent with that of the input pen, and is provided so as to integrally move with the input pen. There are provided in the hemispherical container a plurality of ring-shaped electrodes, which are concentrically provided with the input pen. The input-pen's inclination detecting apparatus of the present invention also comprises (2) a conductive movable body, which is provided in the hemispherical cavity so as to move in the hemispherical cavity due to gravity according to the inclination of the input pen, and (3) a detecting unit for detecting a position of the movable body in the hemispherical cavity in accordance with how continuity is between the ring-shaped electrodes, and for detecting the inclination of the input pen in accordance with the detected position of the movable body.

With the arrangement, it is possible to simplify the structure of the input pen and to manufacture the apparatus at a comparatively low cost, because the position of the movable body moving according to the inclination of the input pen is detected simply by checking the electrical continuity between the ring-shaped electrodes. Moreover, since the inclination of the input pen is detected without detecting a coordinate, the inclination can be found simply by the four basic operations of arithmetic, which even a low function microcomputer can process at a high speed.

A pen input apparatus of the present invention comprises (1) the above-mentioned apparatus for detecting an input-pen's inclination, and (2) line width control means for changing a width of a line drawn by the input pen, corresponding to the inclination detected by the apparatus for detecting an input-pen's inclination.

Such an arrangement requires only inclining the input pen so as to change a line width, thereby allowing the operation to be natural, in which a touch of a writing implement and a feel of handwriting are reproduced. Also making an apparatus superior in the response speed even though employing a low function microcomputer, the arrangement enables the manufacturing of an apparatus at a comparatively low cost.

For a fuller understanding of the nature and advantages of the invention, reference should be made to the ensuing detailed description taken in conjunction with the accompanying drawings.

BRIEF DESCRIPTION OF THE DRAWINGS

FIGS. 3(a)-3(a-1) and 3(b)-3(b-1) are explanatory views respectively showing a hemispherical container provided in the main body of the input pen and a plurality of ring-shaped electrodes P provided on the inner surface of the hemispherical container.

FIG. 4 is a system block diagram of the input pen.

FIG. 7 is a truth table in the case where the total number of ring-shaped electrodes is odd.

FIG. 8 is a truth table in the case where the total number of ring-shaped electrodes is even.

FIGS. 9(a)-9(a-1), 9(b)-9b-1) and 9(c)-9(c-1) are explanatory views showing the changing of contact point between the ring-shaped electrodes and a ball according to the inclination of the input pen.

DESCRIPTION OF THE PREFERRED EMBODIMENTS

[First Embodiment]

The following description will depict an embodiment of the present invention, referring to FIGS. 1 through 11.

The present embodiment deals with a case where an apparatus for detecting an inclination of an input pen which is provided in a pen input apparatus which is capable of changing the width of a line drawn by the input pen according to the inclination of the input pen.

Figure 2:
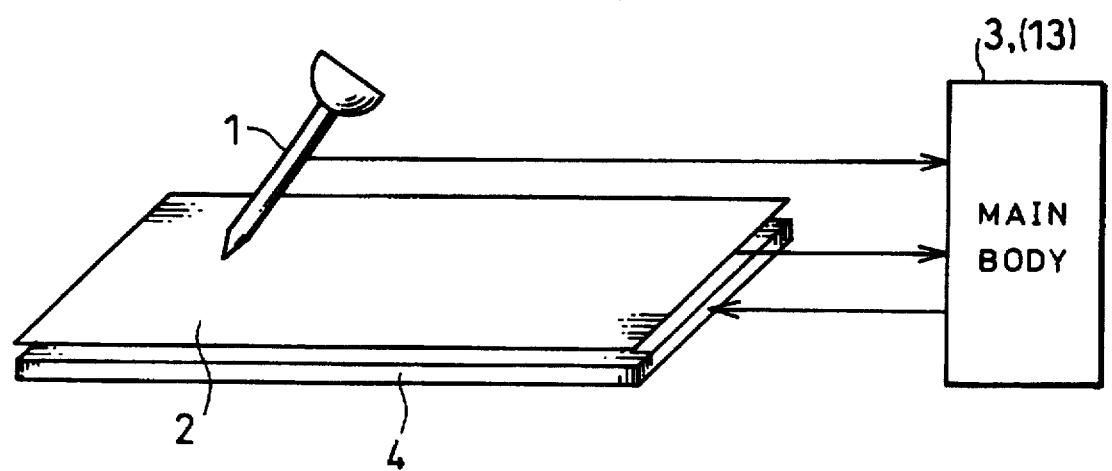
FIG. 2 is a block diagram showing an arrangement of a pen input apparatus for use with the foregoing input pen.

The pen input apparatus, as shown in FIG. 2, comprises an input pen 1, an x-y-coordinate detecting sensor panel 2, a processing unit main body 3, and a flat display panel 4.

The input pen 1 is for indicating an x-y-coordinate on the x-y-coordinate detecting sensor panel 2 so as to input such as characters and figures thereto. The input pen 1, as will be depicted in detail below, sends to the processing unit main body 3 "the degree of an inclination" (hereinafter referred to as the inclination) of the input pen 1 to the normal line of the x-y-coordinate plane. The x-y-coordinate detecting sensor panel 2 detects an x-y-coordinate indicated by the input pen 1, and outputs the detected result to the processing unit main body 3. Based on the signal from the x-y-coordinate detecting sensor panel 2, the processing unit main body 3 produces display data to be displayed on the flat display panel 4, and drives the flat display panel 4 to display the display data.

The processing unit main body 3 changes the width of a line drawn by the input pen 1 depending on the inclination from the input pen 1. More specifically, the greater the inclination is, the thicker the drawn line is, while the smaller the inclination is, the thinner the drawn line is. Thus, the processing unit main body 3 has a function of line width control means. Note that the pen input apparatus of the present embodiment has the x-y-coordinate detecting sensor panel 2 and the flat display panel 4 laid one on top of the other. Such an arrangement ensures that a character or a figure drawn by the input pen 1 is immediately displayed on the flat display panel 4, thereby creating a feel as if it were directly written down in the flat display panel 4.

The following description will explain the structure of the input pen 1 in detail.

Figure 1:
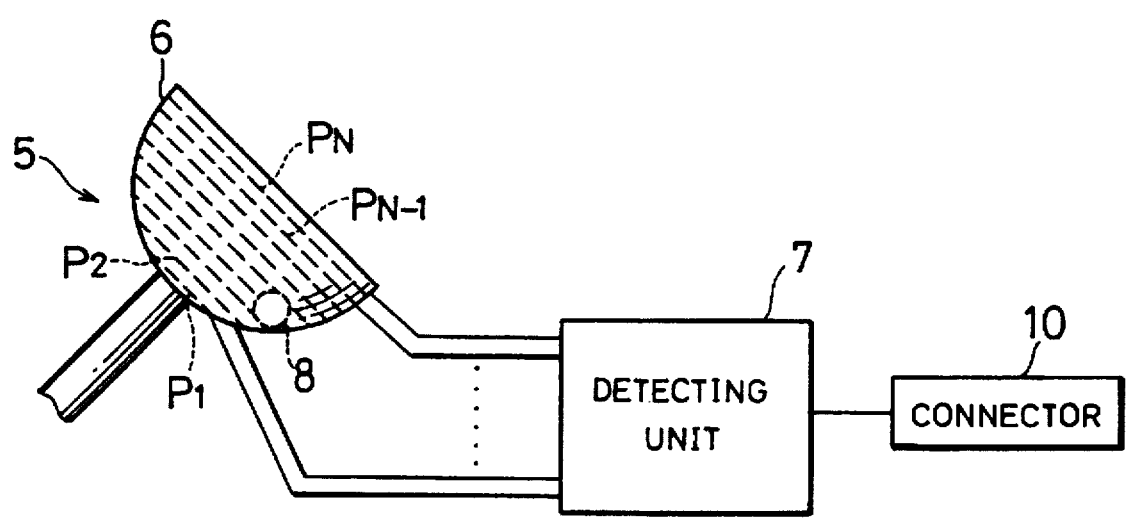
FIG. 1 is a block diagram showing an arrangement of an input pen of one embodiment of the present invention.

FIG. 1 shows a block diagram of the input pen 1. The input pen 1 has a pen main body 5 and a detecting unit 7. The detecting unit 7 is connected with a connector 10 for supplying an output signal from the detecting unit 7 to the processing unit main body 3.

The pen main body 5, as shown in FIG. 3(a)-3(a-1), has a pen shaft 5a. The pen shaft 5a is tapered off to one end, while a hemispherical container 6 is attached on the other end so that the axis of the pen shaft 5a is coincident with that of the hemispherical container 6. The hemispherical container 6 has the hemispherical cavity. There are provided N ring-shaped electrodes P ($P_1$, $P_2$, ... $P_{N-1}$, $P_N$) on the inner surface of the hemispherical container 6 in a concentric manner with a certain interval between the electrodes (see FIG. 3(b)-3(b-1). $P_1$ is the innermost ring-shaped electrode (a ring-shaped electrode is hereinafter referred to as a ring electrode), while $P_N$ is the outermost ring electrode. The central axis of the electrode P1 is coincident with that of the pen main body 5.

As shown in FIG. 3(a), a ball (movable body) 8 made from conductive material is housed in the hemispherical container 6. The gravity moves the ball 8 in the hemispherical container 6 according to an inclination of the pen main body 5 (input-pen's inclination). When the pen main body 5 is not inclined to the normal line of the x-y-coordinate detecting sensor panel 2, the ball 8 lies at the bottom of the hemispherical container 6, in contact only with the ring electrode $P_1$. As the pen body 5 inclines, the ball 8 moves, contacting a pair of adjacent ring electrodes one after another, $P_1$ and $P_2$, then $P_2$ and $P_3$, ... $P_{N-1}$ and $P_N$. The ball 8 is made of, for example, iron or mercury.

Each ring electrode P is connected to the detecting unit 7 (see FIG. 1). The detecting unit 7 has, as shown in FIG. 4, a microcomputer 9, processing means 11 composed of a program ROM (Read Only Memory), RAM (Random Access Memory) for work area for calculation, and an I/O port 12 through which a plurality of signals are sent in parallel to and from the ring electrodes P. The microcomputer 9 is arranged so that in accordance with the program of the processing means 11, the microcomputer 9 gives a voltage to each ring electrode P via the I/O port 12, checks the continuity between the ring electrodes P, and detects an inclination of the pen main body 5 based on the result of the continuity check. The microcomputer 9 also sends the detected inclination to the connector 10, in accordance with the program of the calculating means.

Figure 5:
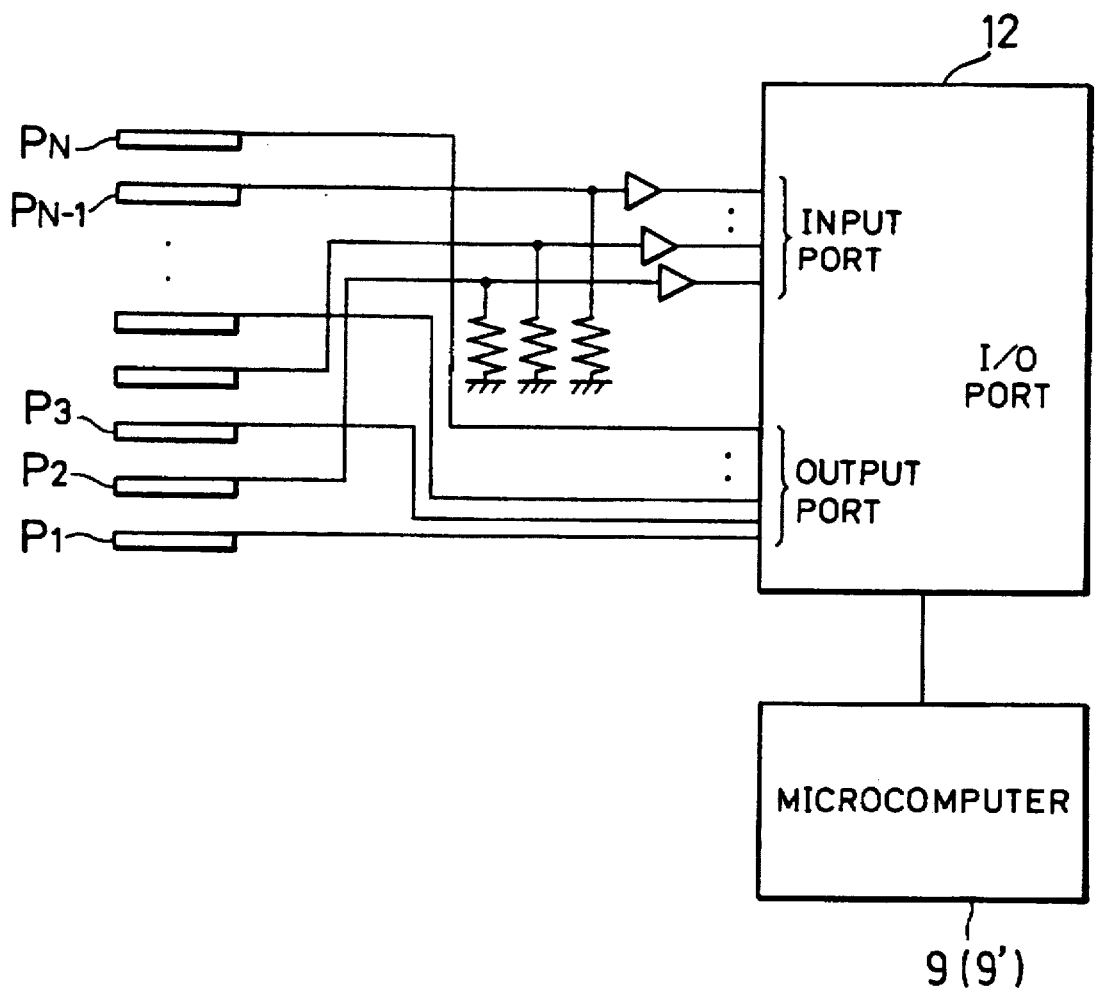
FIG. 5 is a schematics showing how odd-number ring-shaped electrodes are connected with the I/O port.
Figure 6:
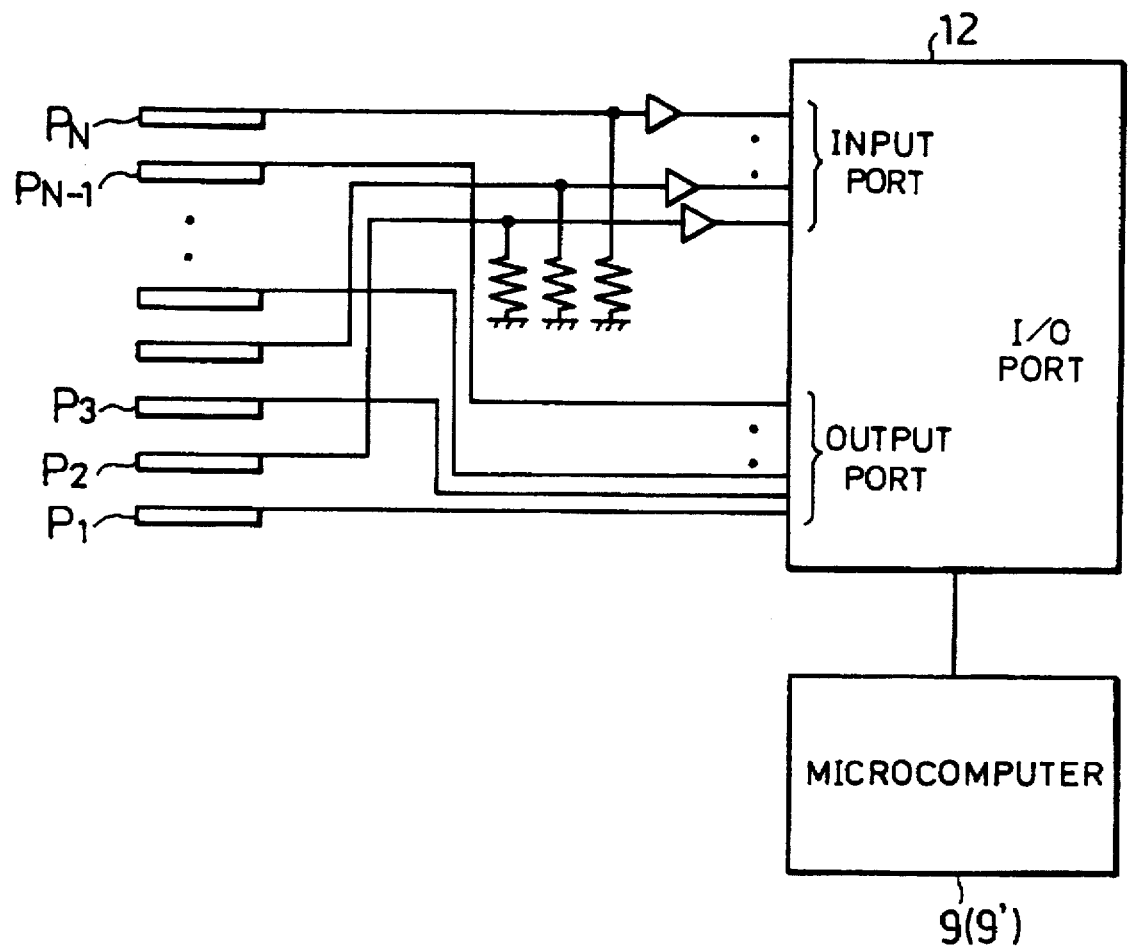
FIG. 6 is a schematics showing how even-number ring-shaped electrodes are connected with the I/O port.

See FIGS. 5 and 6, which are schematics of the ring electrodes P and the I/O port, the former in the case where the total number of the ring electrodes P is odd, and the latter in the case where the total number of the ring electrodes P is even.

As shown in the figures, the odd-numbered ring electrodes $P_1$, $P_3$ ... are respectively connected with the output port of the I/O port 12 so as to serve as voltage output electrodes. On the other hand, the even-numbered ring electrodes $P_2$, $P_4$ ... are respectively connected with the input port of the I/O port 12 so as to serve as voltage input electrodes. Therefore, if the total number N of the ring electrodes P is odd, the ring electrode $P_N$ is connected with the output port, whereas if N is even, $P_N$ is connected with the input port. Such an arrangement, thus connecting N ring electrodes P alternately to the output port and the input port, ensures the detection of continuity between any two adjacent ring electrodes P.

See FIGS. 7 and 8, which are truth tables to be used by the microcomputer, the former in the case where the total number of ring-shaped electrodes is odd, and the latter in the case where the total number of ring-shaped electrodes is even. Note that in both the tables, n is odd when N is odd, while n is even when N is even.

The following explanation will focus on the case where N is odd, referring to FIGS. 9(a)–9(a-1), 9(b)–9(b-1), 9(c), which show how the ball 8 moves in the hemispherical container 6 and how the contact point changes during the move, when the inclination of the pen main body 5 changes. Note that since the same explanation can be adopted to the case where N is even, the explanation of the case where N is even is omitted for the convenience sake.

When N is odd, the odd-numbered ring electrodes P ($P_1$, $P_3$, ..., $P_{n-2}$, $P_n$, ..., $P_{N-2}$, $P_N$), which serve as the voltage output electrodes, are given the voltages (1, 1, ..., 1, 1, ..., 1, 1), as shown in FIG. 7. If the voltages at the even-numbered ring electrodes P ($P_2$, $P_4$, ..., $P_{n-1}$, $P_{n+1}$, ..., $P_{N-3}$, $P_{N-1}$) are (0, 0, ..., 0, 0, ..., 0, 0), this means that there is no continuity. Accordingly, it is found that the ball 8 stays in contact only with the ring electrode $P_1$ because the pen main body 5 is not inclined. Therefore, the inclination is defined as "1".

Likewise, when the ring electrodes P ($P_1$, $P_3$, ..., $P_{n-2}$, $P_n$, ..., $P_{N-2}$, $P_N$) serving as the voltage output electrodes are given the voltages (1, 0, ..., 0, 0, ..., 0, 0) and the voltages of the ring electrodes P ($P_2$, $P_4$, ..., $P_{n-1}$, $P_{n+1}$, ..., $P_{N-3}$, $P_{N-1}$) serving as the voltage input electrodes are (1, 0, ..., 0, 0, ..., 0, 0), this means that the ring electrodes $P_1$ and $P_2$ are conducted (short-circuited). Accordingly, it is found that the ball 8 is in contact with the ring electrodes $P_1$ and $P_2$. Therefore, the inclination is defined as "2".

Likewise, when the ring electrodes ($P_1$, $P_3$, ..., $P_{n-2}$, $P_n$, ..., $P_{N-2}$, $P_N$) serving as the voltage output electrodes are given the voltages (0, 0, ..., 0, 1, ..., 0, 0) and the voltages of the ring electrodes P ($P_2$, $P_4$, ..., $P_{n-1}$, $P_{n+1}$, ..., $P_{N-3}$, $P_{N-1}$) serving as voltage input electrodes are (0, 0, ..., 1, 0, ..., 0, 0), this means that the ring electrodes $P_{n-1}$ and $P_n$ short-circuit. Accordingly it is found that the ball 8 is in contact with the ring electrodes $P_{n-1}$ and $P_n$, as the pen main body 5 inclines to some extent, as shown in FIG. 9(b)–9(b-1). Therefore, the inclination is defined as "n".

Likewise, when the ring electrodes ($P_1$, $P_3$, ..., $P_{n-2}$, $P_n$, ..., $P_{N-2}$, $P_N$) serving as the voltage output electrodes are given the voltages (0, 0, ..., 0, 0, ..., 0, 1) and the voltages of the ring electrodes P ($P_2$, $P_4$, ..., $P_{n-1}$, $P_{n+1}$, ..., $P_{N-3}$, $P_{N-1}$) serving as the voltage input electrodes are (0, 0, ..., 0, 0, ..., 0, 1), this means that the ring electrodes $P_{N-1}$ and $P_N$ short-circuit. In other words, the ball 8 contacts the ring electrodes $P_{N-1}$ and $P_N$, as the pen main body 5 inclines to the maximum extent, as shown in FIG. 9(c)–9(c-1). Therefore, the inclination is defined as "N".

Accordingly, an inclination can be detected by repeating at most N times the steps of: (1) changing voltages to the respective ring electrodes P ($P_1$, $P_3$, ..., $P_{n-2}$, $P_n$, ..., $P_{N-2}$, $P_N$) which serve as the voltage output electrodes, and (2) detecting voltages of the ring electrodes P ($P_2$, $P_4$, ..., $P_{n-1}$, $P_{n+1}$, ..., $P_{N-3}$, $P_{N-1}$) which serve as the voltage input electrodes.

Figure 10:
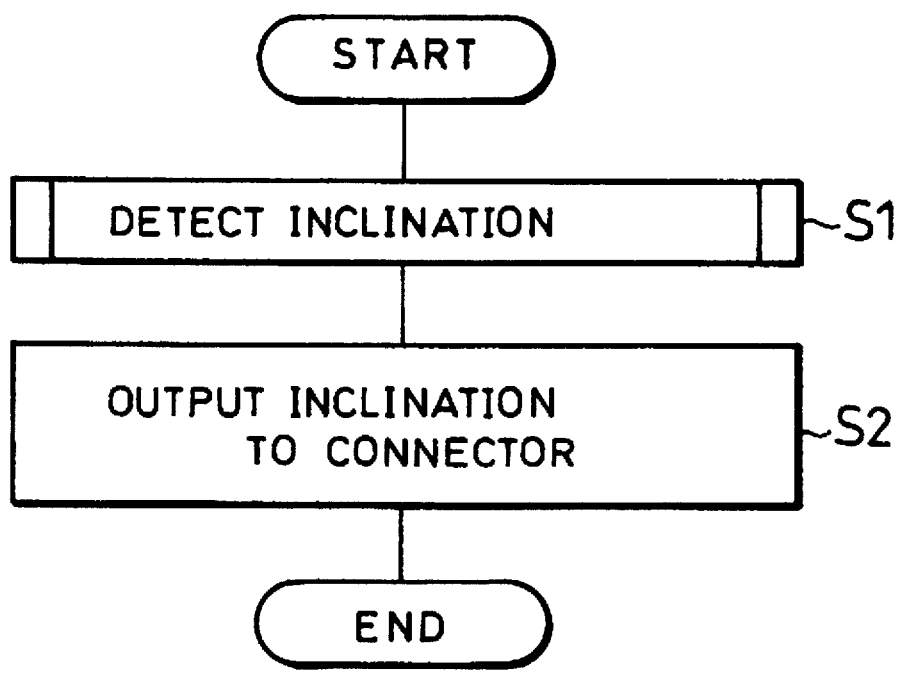
FIG. 10 is a flow chart showing the procedure of detecting of an inclination and outputting it to the main body.
Figure 11:
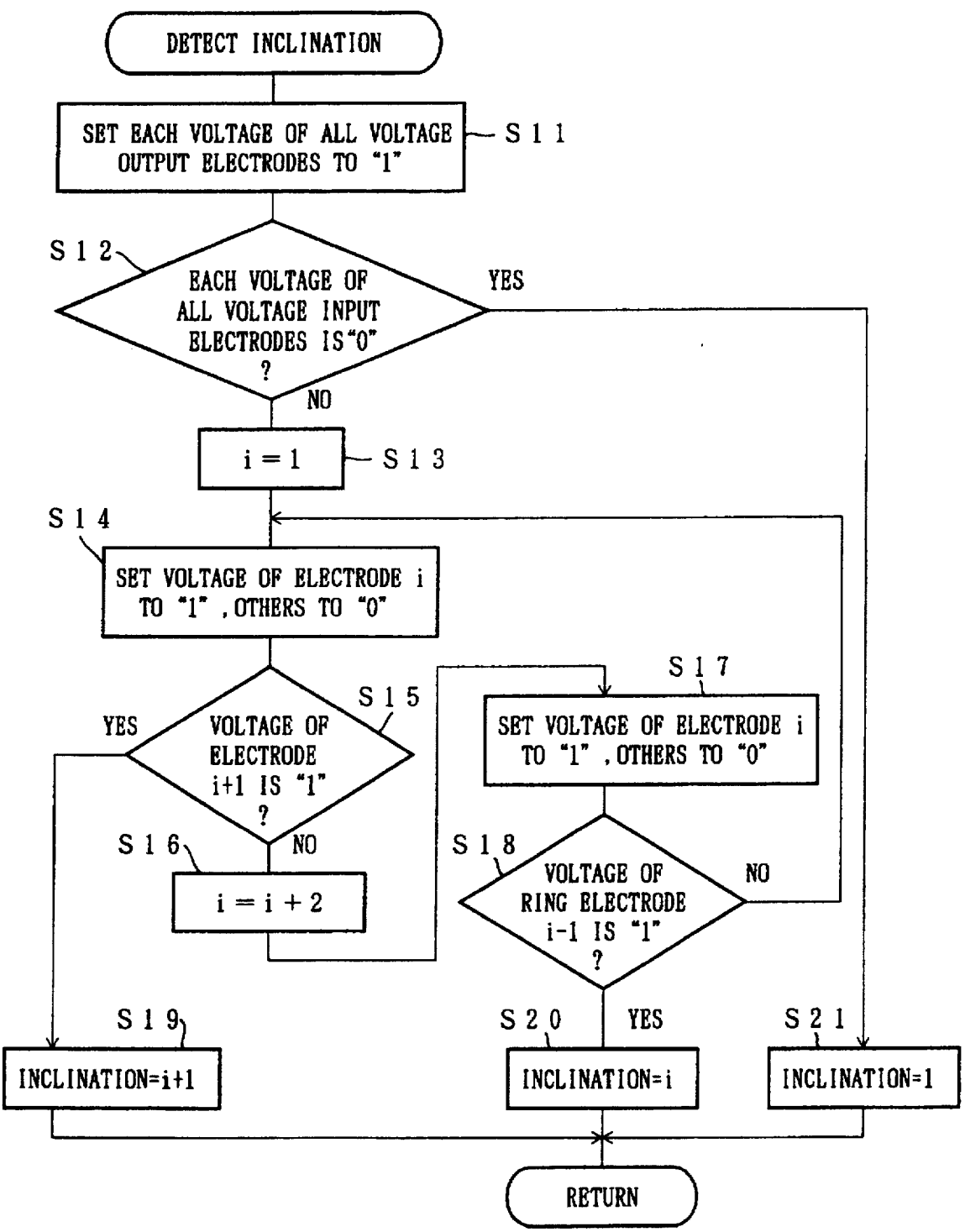
FIG. 11 is a flow chart showing the procedure of detecting an inclination.

The following description will explain the flow of the procedure of finding an inclination and sending thus found inclination to the processing unit main body 3, referring to flow charts shown in FIGS. 10 and 11. Note that the flow charts are adoptable irrespective of whether the total number N of the ring electrodes P is odd or even.

The flow chart in FIG. 11 explains in detail the step S1 in FIG. 10 for detecting an inclination. First, each voltage supplied to the voltage output electrodes which are connected to the output port of the I/O port 12 is set to "1" (S11). Then, the voltages of all the voltage input electrodes which are connected to the input port of the I/O port 12 are checked (S12). If voltage "0" is detected from all the input voltage electrodes, it means that the pen main body 5 is not inclined. In such a case, the flow goes on to S21, where inclination is judged as "1".

On the other hand, if voltage "0" is detected from at least one of the voltage input electrodes in S12, this means that the pen main body 5 inclines to some extent. Therefore, the flow goes on to S13 so as to check the inclination, while a counter i is set to "1". The voltage "1" is supplied to the ring electrode $P_i$ of the voltage output electrodes, while the voltage "0" is supplied to each of the other voltage output electrodes (S14).

At the next step, the voltage of the ring electrode $P_{i+1}$ of the voltage input electrodes is checked (S15). If the voltage "1" is detected from the ring electrode $P_{i+1}$, the flow goes on to S19, where inclination is judged as "i+1".

If the voltage "1" is not detected from the ring electrode $P_{i+1}$ in S15, the counter i is incremented by 2 (S16). Then, the flow moves to S17, where the voltage "1" is supplied to the ring electrode $P_i$ of the voltage output electrodes, while the voltage "0" to each of the other voltage output electrodes.

Then, the voltage of the ring electrode $P_{i-1}$ of the voltage input electrodes (S18) is checked. If the voltage "1" is detected from the ring electrode $P_{i-1}$, the flow moves to S20, where inclination is judged as "i".

If the voltage "1" is not detected from the ring electrode $P_{i-1}$, the operation goes back to S14 for further checking of the inclination, and the steps S14 through S18 are repeated until an inclination is detected.

When the inclination is found in either S19, S20 or S21, the inclination detecting operation ends, and the flow goes on to S2 in FIG. 10. At S2, the inclination thus found is sent through the connector 10 to the processing unit main body 3. The processing unit main body 3 performs a data processing such that a thin line is drawn when the inclination is small while a thick line is drawn when the inclination is great.

As has been described so far, the pen main body 5 of the input pen 1 in accordance with the present embodiment is provided with the hemispherical container 6. The hemispherical container 6 has the ball 8 inside and is provided with a plurality of ring electrodes P in the inner surface, so that a position of the ball moving according to the input pen's inclining is detected simply by checking the electrical continuity between the ring electrodes through the ball 8. The detected position of the ball is used for detecting an inclination of the input pen 1.

Therefore, such an arrangement simplifies the structure of the input pen and reduces the cost, since an exciting coils are not requisite in the input pen for detecting coordinates. In addition, a generally low function microcomputer can be used as the microcomputer 9 with quick response and without heavy load, since no complicated calculations are required unlike the case where a coordinate detecting-use exciting coils are requisite.

Further, the conventional arrangement using exiting coils causes such a problem that a coordinate cannot be detected and an inclination cannot be found when the input pen points an edge of the coordinate input unit and the exciting coils in the input pen positions away from the coordinate input unit. The present arrangement, in contrast, is able to detect an inclination of the input pen 1 without detecting a coordinate. Therefore, with the present arrangement, it is possible to detect the inclination whenever inputting the x-y-coordinate of the position touched by the input pen 1 is possible.

Moreover, the present pen input apparatus is superior in reproducing a taste of a writing implement and a feel of handwriting, because it is arranged so that the width of a line drawn by the input pen 1 is varied based on the inclination of the input pen 1, that is, the width of a line can be changed by only inclining the input pen 1. Thus, such a superior apparatus is realized in a simple structure and at a comparatively low cost, which can quickly respond even though a low function microcomputer is employed as the microcomputer 9 provided in the input pen 1.

[Second Embodiment]

The following description will discuss another embodiment of the present invention, referring to FIGS. 1 through 11, which are referred to in the description of the first embodiment. The members having the same structure (function) as in the first embodiment will be designated by the same reference numeral and their description will be omitted.

A pen input apparatus of the present embodiment, as shown in FIG. 2, is the same as that of the first embodiment, except the processing unit main body 3. According to the present embodiment, substituted for the processing unit main body 3 of the first embodiment is a processing unit main body 13 (z-coordinate detecting means) which detects a z-coordinate in the direction of the normal line of the x-y-coordinate plane based on the inclination of the input pen, so that a three-dimensional figure can be inputted.

Note that it is possible to refer to FIGS. 1, 3(a), 3(b), through 11, which have been already referred to hereinbefore, regarding the block diagram of the input pen 1, the block diagram of the pen input apparatus, the arrangement of the ring electrodes in the input pen 1, the schematics of the ring electrodes and the I/O port 12 when the total number N of the ring electrodes is odd and when it is even, the truth tables and the flow charts.

Such an arrangement realizes a pen input apparatus, in a simple structure and at a comparatively low cost, which can input a z-coordinate in the normal direction of the area for inputting by only inclining the input pen 1, thereby being able to input a three-dimensional figure. In addition, the apparatus can quickly respond even though a low function microcomputer is employed as the microcomputer 9 provided in the input pen 1.

[Third Embodiment]

Figure 12:
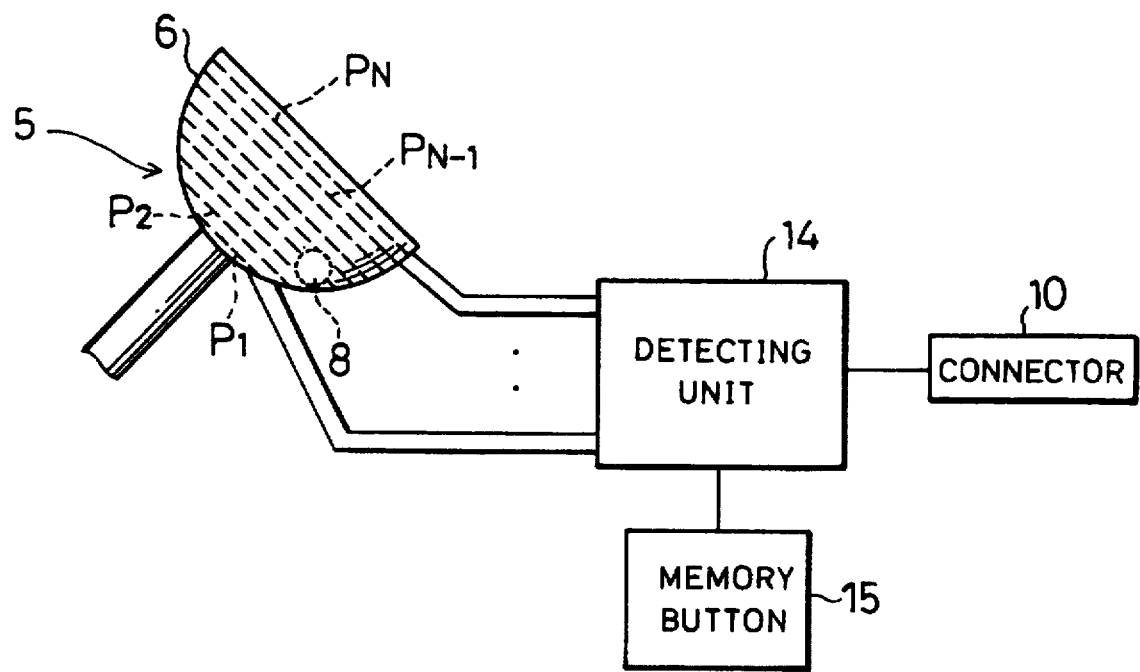
FIG. 12 is a block diagram showing an arrangement of an input pen of another embodiment in accordance with the present invention, which has a function of temporarily setting an inclination.
Figure 13:
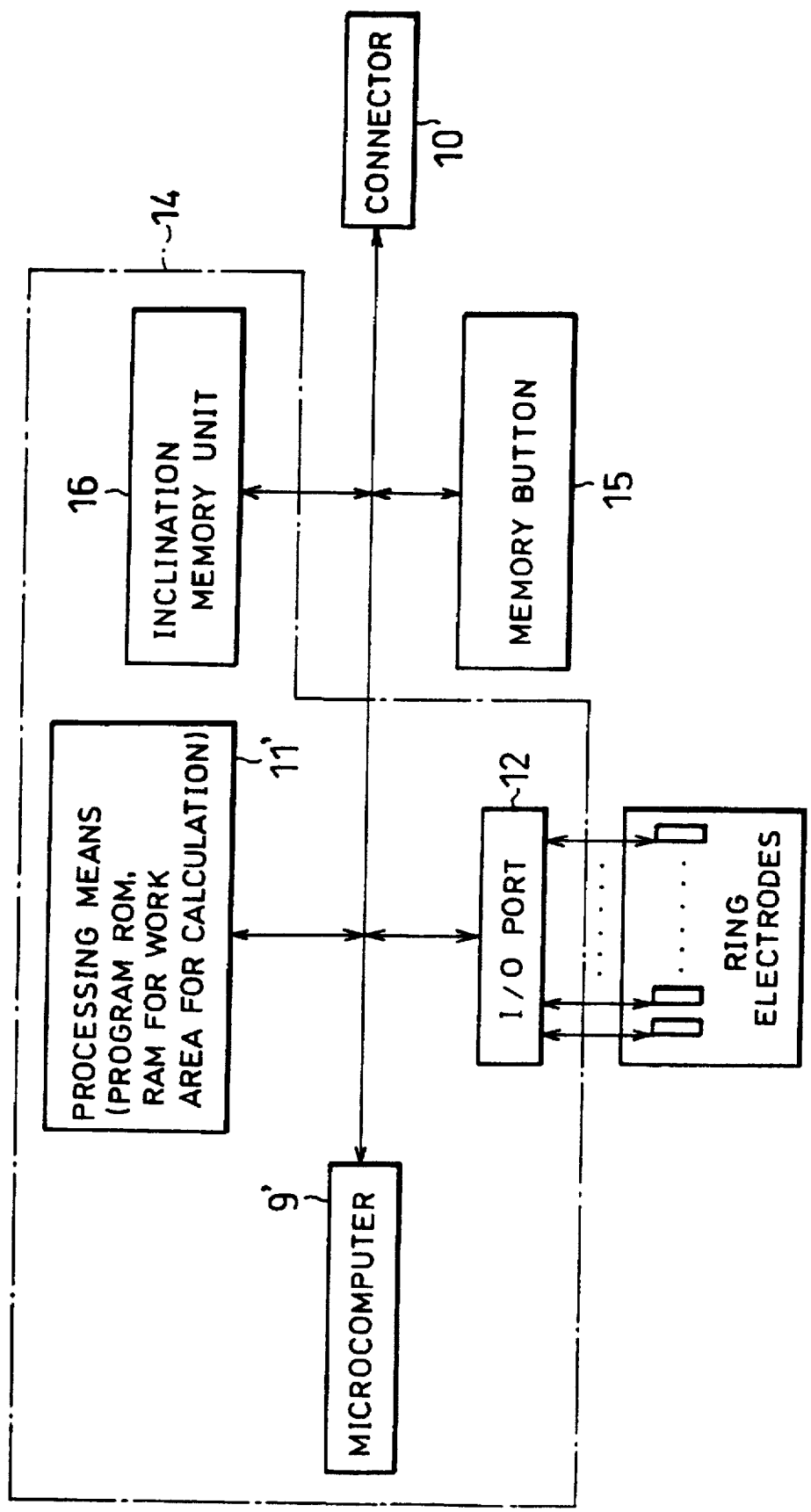
FIG. 13 is a system block diagram of the foregoing input pen.
Figure 14:
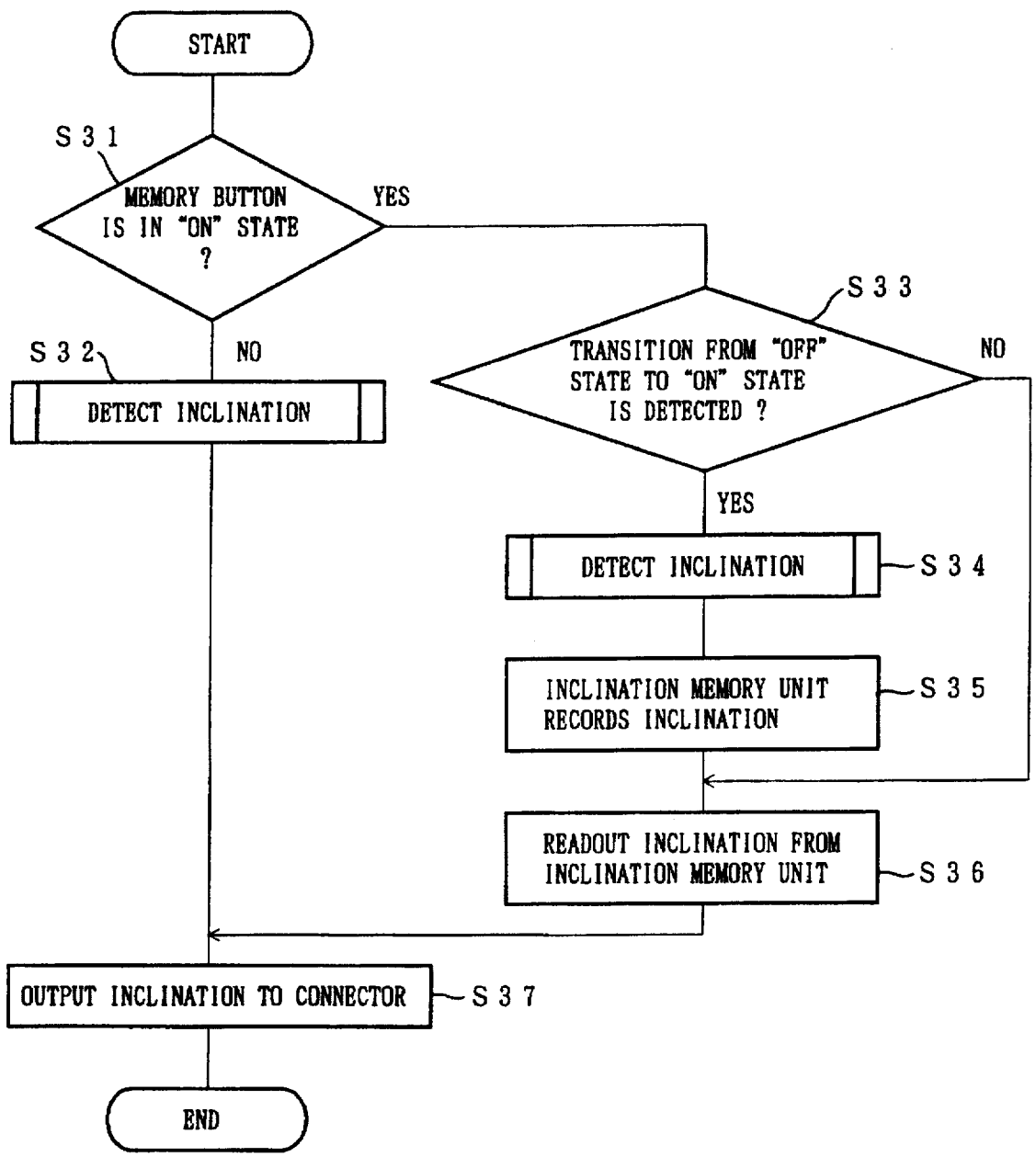
FIG. 14 is a flow chart showing the procedure of detecting an inclination and outputting it to the main body in the case where the foregoing input pen is employed.
Figure 15:
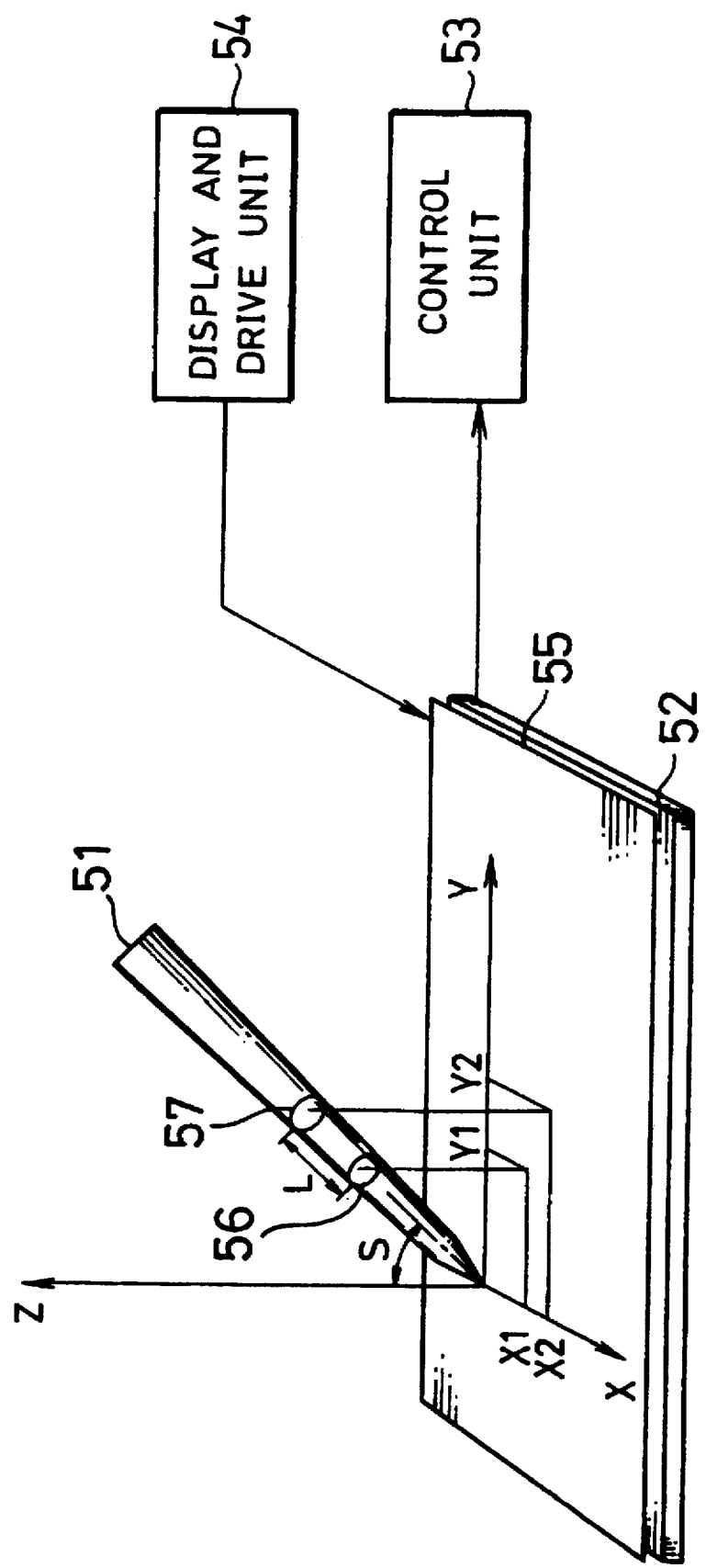
FIG. 15 is a block diagram showing an arrangement of a conventional pen input apparatus.

The following description will discuss a still another embodiment of the present invention, referring to FIG. 12 through 14, as well as FIG. 2 through 8 and 11 which were referred to in the description of the first embodiment. The members having the same structure (function) as those in the above-mentioned embodiments will be designated by the same reference numbers and their description will be omitted.

A pen input apparatus of the present embodiment is arranged so that, as shown in FIG. 12, N ring electrodes P of the pen main body 5 are connected to a detecting unit 14, instead of the detecting unit 7, and a signal from a memory button 15 is sent to the detecting unit 14. The memory button 15 is pressed by a user when it is necessary to temporarily store a degree of an inclination (hereinafter referred to as an inclination) of the input pen 1, which is obtained by the detecting unit 14. In other words, it functions as inclination temporary storing means.

As shown in FIG. 13, the detecting unit 14 comprises an inclination memory unit 16, as well as a microcomputer 9', processing means 11', and an I/O port 12'. The microcomputer 9', in accordance with the program of the processing means 11', (1) supplies a voltage to each ring electrode P via the I/O port 12, (2) checks the continuity between the ring electrodes P, (3) detects an inclination of the input pen based on the result of the continuity check, and (4) outputs it to the connector 10. The microcomputer 9' stores an inclination in the inclination memory unit 16, as well as reads out the stored inclination from the inclination memory unit 16. Such a storing operation is performed with respect to the inclination memory unit 16 when a command for storing an inclination is issued in the "ON" state of the memory button 15. When it is detected that the memory button 15 is in the "ON" state, the microcomputer 9' outputs the inclination through the connector 10 as well as stores the inclination in the inclination memory unit 16. The inclination read out from the inclination memory unit 16 is utilized when the memory button is in the "ON" state, while the detected inclination is utilized when the memory button is in the "OFF" state.

Note that it is possible to refer to FIGS. 2, 3(a), 3(b), and 5 through 8, which have been already referred to hereinbefore, regarding the block diagram of the pen input apparatus, the arrangement of the ring electrodes in the input pen 1, the schematics of the ring electrodes and the I/O port 12 when the total number N of the ring electrodes is odd and when it is even, and the truth tables.

The following description will depict the flow of the procedure of detecting an inclination and sending the detected inclination to the processing unit main body 3, with reference to the flow chart in FIG. 14. Note that the flow chart is adoptable irrespective of whether the total number N of the ring electrodes P is odd or even.

First, it is checked whether the memory button 15 is in the "ON" state or in the "OFF" state (S31). If the memory button 15 is in the "OFF" state at S31, the operation of detecting an inclination (see FIG. 11 which is referred to in the first embodiment) is undertaken so that a new inclination is detected (S32).

On the other hand, when the memory button 15 is in the "ON" state at S31, it is judged whether or not a transition from the "OFF" to the "ON" state is detected (S33). When it is judged that such a transition is detected, the operation for detecting an inclination is performed and an inclination is detected (S34). The detected inclination is stored in the inclination memory unit 16 (S35), so that the inclination is read out from the inclination memory unit 16 (S36). On the other hand, if it is judged in S33 that a transition from the "OFF" state to the "ON" state is not detected, the flow moves to S36, skipping S34 and S35. In S36, an inclination is read out from the inclination memory unit 16.

In S37, the inclination obtained either in S32 or S36 is sent through the connector 10 to the processing unit main body 3. The processing unit main body 3 performs a data processing operation so that a line has a width corresponding to the inclination.

Thus, with the arrangement of the present embodiment, the memory button 15 is provided, and when the button 15 is in the "ON" state, the inclination stored in the inclination memory unit 16 is sent to the processing unit main body 3. The apparatus of the first embodiment, when drawing a line in a certain fixed width, requires such a virtually impossible manipulation as maintaining the inclination of the input pen 1 at a fixed degree. In contrast, the apparatus of the present embodiment ensures to easily draw a line in a certain fixed width, since the fixed inclination which has been stored is sent to the processing unit main body 3 regardless of the changing actual inclination of the input pen 1.

Note that when the pen input apparatus provided with the processing unit main body 13, which was employed in the second embodiment, is adopted to the arrangement of the present embodiment in the place of the pen input apparatus provided with the processing unit main body 3, it is possible to input x-y-coordinates with the z-coordinate fixed.

In addition, it is possible to give the processing unit main body 3 the function of outputting a certain fixed inclination when the inclination is fixed, whereas in the present embodiment the function is performed by the detecting unit 14.

As has been described so far, the apparatus for detecting input-pen's inclination of the present invention is provided in a pen input apparatus, which has an input pen for inputting information such as characters, figures, and coordinates. The apparatus for detecting input-pen's inclination comprises a hemispherical container, a conductive movable body, and a detecting unit. The hemispherical container, in which a hemispherical cavity is created, has an axis congruent with the axis of the input pen and is provided so as to integrally move with the input pen, while a plurality of ring electrodes are concentrically provided with the input pen. The conductive movable body is provided in the hemispherical cavity so as to move in the hemispherical cavity according to the inclination of the input pen due to gravity. The detecting unit detects the position of the movable body in the hemispherical cavity in accordance with how continuity is between the ring electrodes, and detects the inclination of the input pen in accordance with the detected position of the movable body.

With such an arrangement of the apparatus for detecting an inclination of an input pen, when the input pen inclines, the movable body moves according to the inclination due to the gravity. During the move, the movable body contacts a plurality of ring electrodes one after another, which are provided on the inner surface of the hemispherical container, thereby one after another causing a pair of electrodes in contact with the movable body to short-circuit.

For example, assuming that the total number of the ring electrodes is N, when the input pen gradually inclines from the condition of no inclination to the condition of the maximum inclination, the ring electrodes in contact with the movable body change as follows. First, the movable body contacts only the innermost electrode (first electrode), and next, it contacts the first and second electrodes, contacts the second and third electrodes, and finally contacts the (N−1)th and N'th electrodes, thereby causing the adjacent electrodes to short-circuit. So as to find on which position out of the N possible positions the movable body is, the detecting unit checks the continuity between the electrodes, thereby finding one out of the N inclinations, each of which corresponds to each of the N positions of the movable body.

Thus, unlike the conventional arrangement, exciting coils for detecting coordinates are not required to be provided inside the input pen, and the inclination of the input pen is found by detecting, only based on the conditions of electrical continuity between adjacent electrodes, the position of the movable body which moves according to the inclination of the input pen. Therefore, the present invention ensures the simplification of the structure of the input pen and reduces the cost to a comparatively low level.

In addition, the conventional arrangement requires to repeat complicated calculations for finding an inclination angle whenever the inclination of the input pen changes. Therefore, such calculation causes a microcomputer, generally low function, which are provided in the input pen, to have a heavy load. This causes the microcomputer not to quickly respond. In contrast, since only four basic operations of arithmetic are used for a calculation if any in the present invention, even a low function microcomputers can process such a calculation at a high speed.

Further, the conventional arrangement has a problem that when the input pen is positioned away from the coordinate input unit, the detection of a coordinate is impossible. In contrast, with the present arrangement, detecting an inclination is possible at any time, since a coordinate is not requisite for detecting the inclination of the input pen.

The first pen input apparatus of the present invention has (1) the foregoing apparatus for detecting an inclination of an input pen, and (2) line width control means which changes the width of a line drawn by the input pen, according to the inclination detected by the apparatus for detecting an input-pen's inclination.

With the arrangement, the first pen input apparatus is provided with the line width control means as well as the apparatus for detecting an inclination of an input pen, so that the line width control means changes the width of a line drawn by the input pen according to the inclination detected by the apparatus for detecting an input-pen's inclination. Therefore, the arrangement requires only the inclining of the input pen so as to change the width of a line, thereby allowing the handling to be natural and reproducing a touch of a writing implement and a feel of handwriting. Moreover, the use of a low function microcomputer doesn't affect the response speed. Accordingly, such a superior pen input apparatus is realized in a simple structure at a comparatively low cost.

The second pen input apparatus of the present invention is provided with the apparatus for detecting an inclination of an input pen and z-coordinate detecting means, so that the z-coordinate detecting means detects a coordinate in the normal direction of the area for inputting, according to the inclination detected by the input-pen's inclination detecting apparatus. Therefore, it is possible to input a z-coordinate only by inclining the input pen. Moreover, the use of a low function microcomputer doesn't affect the response speed. Accordingly, such a pen input apparatus capable of inputting a three-dimensional figure is realized in a simple structure at a comparatively low cost.

The third pen input apparatus of the present invention has memory means and inclination fix commanding means in addition to an arrangement of either the first or the second pen input apparatus. The inclination fix commanding means commands that the inclination of the input pen which is detected by the input-pen's inclination detecting apparatus is stored and that the stored inclination is used instead of an inclination detected at the moment. When the inclination temporary setting means commands as such, the memory means temporarily stores an inclination detected by the apparatus for detecting an inclination of an input pen, and the line width control means or the z-coordinate detecting means utilizes the inclination stored by the memory means instead of an inclination actually detected at the moment.

With the arrangement of the first apparatus, or that of the second apparatus, when a line should be drawn in a certain fixed breadth, or when x-y-coordinates should be inputted with a z-coordinate fixed, for example, contour lines are drawn, any slight change in the inclination of the input pen is not allowed during an operation, but such an operation is virtually impossible. However, the arrangement of the third pen input apparatus enables to draw a line in a fixed width and to input x-y-coordinates with a z-coordinate fixed, by using an inclination recorded by the memory means.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for detecting an inclination of an input pen, the input pen being provided for inputting information such as characters, figures, and coordinates said apparatus comprising:

a hemispherical container, in which a hemispherical cavity is created, having an axis congruent with that of the input pen, said hemispherical container being provided so as to integrally move with the input pen, and being provided with a plurality of ring-shaped electrodes, the ring-shaped electrodes being concentrically provided with the input pen;

a conductive movable body, which is provided in the hemispherical cavity so as to move in the cavity due to gravity according to the inclination of the input pen; and a detecting unit for detecting a position of said movable body in the hemispherical cavity in accordance with how continuity is between the ring-shaped electrodes, and for detecting the inclination of the input pen in accordance with the detected position of said movable body.

2. A pen input apparatus, comprising:

an apparatus for detecting an inclination of an input pen; and line width control means for changing a width of a line drawn by the input pen, according to the inclination detected by said apparatus for detecting an inclination of an input pen, wherein said apparatus for detecting an inclination of an input pen includes:

a hemispherical container, in which a hemispherical cavity is created, having an axis congruent with that of the input pen, said hemispherical container being provided so as to integrally move with the input pen, and being provided with a plurality of ring-shaped electrodes, the ring-shaped electrodes being concentrically provided with the input pen;

a conductive movable body, which is provided in the hemispherical cavity so as to move in the cavity due to gravity according to the inclination of the input pen; and a detecting unit for detecting a position of said movable body in the hemispherical cavity in accordance with how continuity is between the ring-shaped electrodes, and for detecting the inclination of the input pen in accordance with the detected position of said movable body.

3. A pen input apparatus, comprising:

an apparatus for detecting an inclination of an input pen; and z-coordinate detecting means for detecting a coordinate in a normal direction of the area for inputting, according to the inclination detected by said apparatus for detecting an inclination of an input pen, wherein said apparatus for detecting an inclination of an input pen includes:

a hemispherical container, in which a hemispherical cavity is created, having an axis congruent with that of the input pen, said hemispherical container being provided so as to integrally move with the input pen, and being provided with a plurality of ring-shaped electrodes, the ring-shaped electrodes being concentrically provided with the input pen;

a conductive movable body, which is provided in the hemispherical cavity so as to move in the cavity due to gravity according to the inclination of the input pen; and a detecting unit for detecting a position of said movable body in the hemispherical cavity in accordance with how continuity is between the ring-shaped electrodes, and for detecting the inclination of the input pen in accordance with the detected position of said movable body.

4. A pen input apparatus as set forth in claim 2, further comprising:

memory means for storing the inclination detected by said apparatus for detecting an inclination of an input pen; and inclination fix commanding means for commanding said memory means to temporarily store the inclination detected by said apparatus for detecting an inclination of an input pen, and for commanding said line width control means that the inclination stored by said memory means is substituted for an actually-detected inclination.

5. A pen input apparatus as set forth in claim 3, further comprising:

memory means for storing the inclination detected by said apparatus for detecting an inclination of an input pen; and inclination fix commanding means for commanding said memory means to temporarily store the inclination detected by said apparatus for detecting an inclination of an input pen, and for commanding said z-coordinate detecting means that the inclination stored by said memory means is substituted for an actually-detected inclination.

6. The apparatus for detecting an inclination of an input pen as set forth in claim 1, wherein said detecting unit includes:

an I/O port having an output port for outputting a voltage and an input port for inputting a voltage; and a processor for checking whether or not the voltage supplied through the output port to a ring-shaped electrode is detected by an adjacent electrode of an input port, so as to specify which electrodes short-circuit, and for calculating the inclination of the input pen based on the checked result.

7. The apparatus for detecting an inclination of an input pen as set forth in claim 1, wherein said movable body is either an iron ball or a mercury ball.

8. A pen input apparatus as set forth in claim 2, further comprising:

a flat display panel;

a sensor panel, being provided on said flat display panel, for sensing a touch of the input pen, and for inputting the touched position on said flat display panel as a position information; and an information processing unit for performing a predetermined data information processing operation so that thus processed data is displayed on said flat display panel, the data information processing operation being conducted based on the position information obtained by said sensor panel.

* * * * *